Patented July 30, 1946

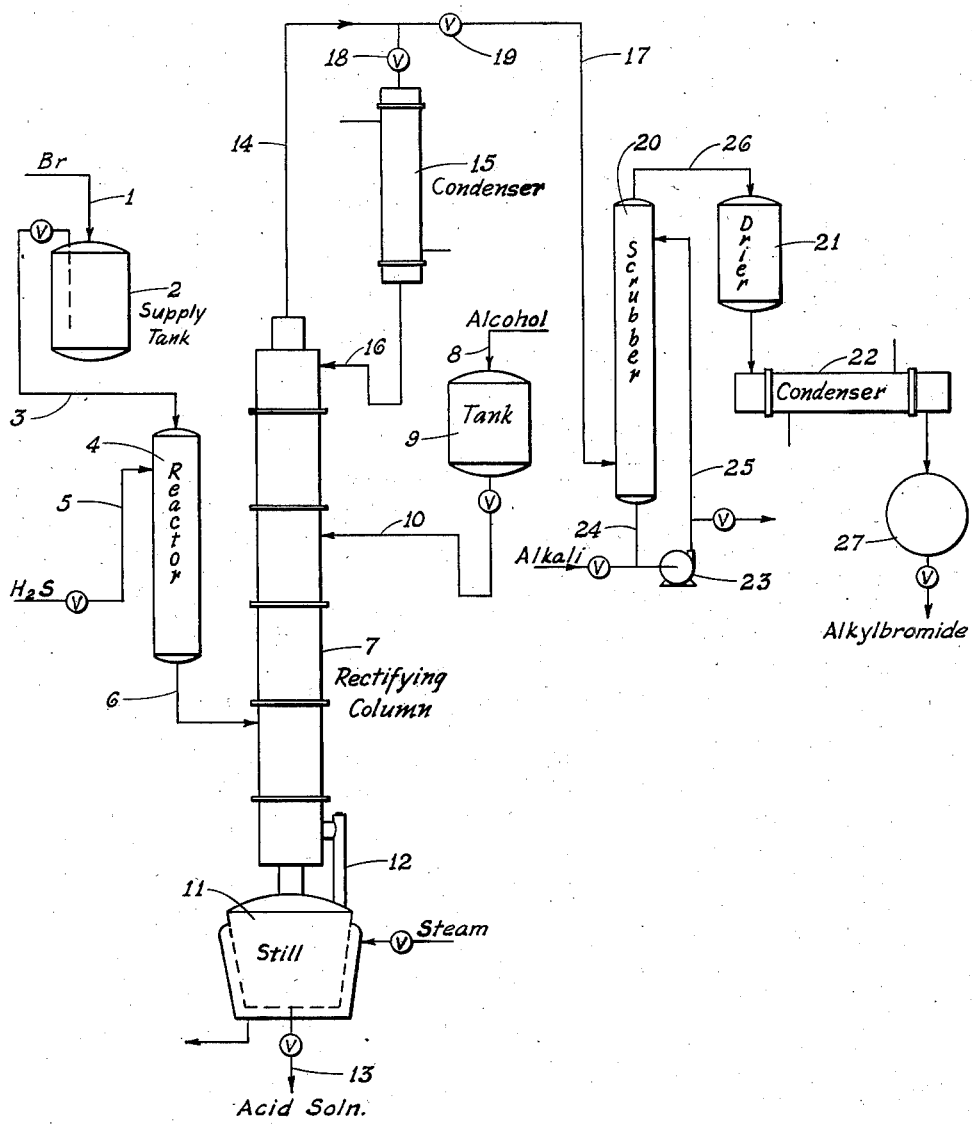

2,404,800

UNITED STATES PATENT OFFICE 2,404,800

PROCESS FOR THE PRODUCTION OF ALKYL BROMIDES

Wilhelm Hirschkind, Berkeley, Calif., assignor to The Dow Chemical Company, Midland, Mich., a corporation of Michigan Application January 31, 1944, Serial No. 520,487

4 Claims. (Cl. 260—657)

This invention relates to the manufacture of alkyl bromides, such as methyl bromide and ethyl bromide. The usual process for making alkyl bromides is by the reaction of hydrobromic acid and the corresponding monohydric alcohol in the presence of a dehydrating agent, such as sulphuric acid. An improvement on the conventional process is described in U. S. Patent No. 2,173,133, in which the hydrobromic acid to be reacted with the alcohol is formed in situ by reaction of $SO_2$ and bromine. The latter process is successfully used commercially, but is subject to a practical limitation in requiring the use of $SO_2$ of a high degree of concentration, which is not readily available at many locations. It is desirable to enable volatile alkyl bromides to be made by a process having the advantages of the process of Patent No. 2,173,133, but without requiring a plant for making concentrated $SO_2$ at the same location.

It is, therefore, an object of the present invention to provide a process for making alkyl bromides from the corresponding alcohols and hydrobromic acid, wherein the latter is formed in situ during the process, which process is free from limitation as to an available source of concentrated $SO_2$.

A further object is to obviate the necessity for employing $SO_2$ in such process.

Another object is to enable volatile alkyl bromides to be produced by a continuous process with minimum consumption of raw materials.

Still another object is to provide a continuous process for making methyl bromide or ethyl bromide of a high degree of purity.

In a co-pending application of David J. Pye, Serial No. 520,486, filed Jan. 31, 1944, a process of the present general character is disclosed, in which sulphur and bromine are reacted in the presence of an aliphatic alcohol whereby hydrobromic acid is formed in situ and in turn reacts with the alcohol to form the alkyl bromide. The present invention is a modification of the process described in the said co-pending application, in which hydrogen sulphide is employed instead of sulphur to obtain certain additional advantages, as will hereinafter appear.

According to my invention hydrogen sulphide is reacted with bromine to form hydrobromic acid, as shown by the equation;

(1) $H_2S + Br_2 \rightarrow 2HBr + S$

An excess of bromine is employed which dissolves the sulphur formed in Equation 1 and prevents its precipitation in the reaction mixture. The mixture is then added to the alcohol, e. g. methyl alcohol, whereby HBr reacts with the alcohol according to the equation (2) $HBr + CH_3OH \rightleftarrows CH_3Br + H_2O$ forming methyl bromide and water. The water so formed reacts in turn with the sulphur and excess bromine which is present according to the equation (3) $S + 3Br_2 + H_2O \rightleftarrows 6HBr + H_2SO_4$ and this additional HBr also reacts with the alcohol according to Equation 2 forming methyl bromide. A summation of the foregoing reactions is expressed by the following equation;

(4) $H_2S + 4Br_2 + 8CH_3OH \rightleftarrows$
$8CH_3Br + H_2SO_4 + 4H_2O$

In carrying out the process the reagents are preferably employed in approximately the proportions shown by Equation 4. It is seen that only one mol of $H_2S$ is required for formation of 8 mols of $CH_3Br$. Water and $H_2SO_4$ produced in the reaction are in proportions such as to form a solution of $H_2SO_4$ of about 57 per cent concentration. The simultaneous formation of sulphuric acid is advantageous, in that the acid acts as a dehydrating agent for the esterification of the alcohol, which is required to secure an equilibrium condition favorable to a high percentage yield of alkyl bromide. The acid solution thereby formed is not of sufficient strength to cause any substantial dehydration of the alcohol to form the corresponding ether as an undesired by-product. For the reaction anhydrous alcohol is preferred, although it may contain up to about 5 per cent of water without material disadvantage, so long as the strength of the resulting acid solution is not reduced below about 50 per cent.

The process can be carried on as a batch operation. It is well adapted to continuous operation, in which the reaction mixture of $H_2S$ and $Br_2$ is introduced into a rectifying column and there intermixed with an inflowing stream of alcohol. The volatile alkyl bromide is continuously removed as vapor overhead, while the acid solution is withdrawn at the bottom. Such continuous mode of operation is more particularly described in connection with the annexed drawing, in which the single figure is a diagrammatic representation of a suitable apparatus and also serves as a flow-sheet of materials in process.

Referring to the drawing, bromine is admitted by pipe 1 to a supply tank 2, whence it is forwarded by pipe 3 to a reactor 4 packed with Raschig rings of ceramic material or the equivalent. Hydrogen sulphide gas is admitted to reactor 4 through pipe 5. In reactor 4 the bromine and hydrogen sulphide react according to Equation 1 supra, forming hydrogen bromide and sulphur, a sufficient excess of bromine being used to hold the sulphur in solution. Preferably the proportions of bromine and hydrogen sulphide are 4 mols of the former to one mol of the latter, as shown in Equation 4 supra. The reaction mixture of HBr and S dissolved in excess bromine flows through pipe 6 to column 7, entering the latter preferably at a point about one-third of the height from the bottom. The alcohol, e. g. methanol or ethanol, is supplied through pipe 8 to a feed tank 9, from which it is fed through pipe 10 to column 7 at a point preferably somewhat above the mid-section.

Column 7 is provided with a packing of acid-resistant material, such as Raschig rings or the like. At the bottom it communicates with a still 11 having a steam jacket or other means for heating the same. A vapor tube 12 serves to conduct vapors from the top of still 11 into the lower part of column 7. Steam connections are provided to the jacket of still 11, which is drained through pipe 13.

The mixture of bromine, sulphur and HBr introduced into column 7 through pipe 6 is commingled therein with the alcohol introduced through pipe 10 and flowing downwardly over the packing. Reaction occurs with liberation of heat in accordance with Equations 2 and 3 supra. Water formed by the esterification reaction (2) supplies the water requirement for reaction (3). The vaporizable components and products of the reactions which occur simultaneously in the column are continuously rectified therein, the highest boiling fraction being a sulphuric acid solution which flows out at the bottom into the still, while a vapor fraction passes off through vapor pipe 14 at the top. By regulating the flow of materials into the column approximately according to the molar proportions given in Equation 4 supra, the $H_2SO_4$ solution in still 11 will have a strength of about 57 per cent. The acid solution in still 11 is heated to boiling to expel any amounts of bromine and HBr that are dissolved therein, the vapors being returned to the column. As the acid solution accumulates in the still it is withdrawn continuously or intermittently through outlet 13. The rate of feed of materials into the column 7 is adjusted to establish the desired alkyl bromide production rate. The reflux returned through line 16 is adjusted to maintain a definite reaction zone between inlet 10 and a point slightly below inlet 6.

The volatile reaction product rises toward the top of the column, operation of which is controlled by means of reflux to permit the escape overhead through pipe 14 of vapors consisting substantially of pure alkyl bromide. To provide suitable reflux the overhead vapor stream is divided, a portion being directed to a condenser 15 from which the condensate is returned to the top of column 7 as reflux through pipe 16. The other portion of vapors is carried off through pipe 17 to a purification and condensation system. The proportioning of the overhead vapors as reflux and product is controlled by means of valves 18 and 19.

The product vapors in pipe 17, which under proper operation consist of the alkyl bromide to the extent of more than 99 per cent, but contain traces of the alkyl ether, and occasionally HBr or bromine, are conducted to a purifying system comprising an alkali scrubber 20 and a drier 21, and thence to a condenser 22. In scrubber 20 the vapors are washed with an aqueous solution of an alkali metal hydroxide or carbonate to remove acid impurities, the alkaline solution being circulated by pump 23 and pipes 24 and 25. The scrubbed vapors then pass through pipe 26 to drier 21, which conveniently is of the adsorption type charged with silica gel or equivalent adsorbent, which removes water vapor and traces of ether. From the drier the vapors pass to condenser 22, cooled by a refrigerant solution, and the condensate to storage tank 27.

When the product of the process is methyl bromide, the above described purification steps may be carried out at ordinary temperature without causing condensation of the methyl bromide vapors. In the case of ethyl bromide sufficient heat may be added to prevent condensation of the same in the scrubber or drier, conveniently by scrubbing with an alkaline solution warmed to a temperature above the boiling point of ethyl bromide.

The herein described process, when carried out in the continuous manner as shown, is particularly advantageous for the reason that the continuous removal of end products, i. e. alkyl bromide and sulphuric acid solution, from the reaction zone constantly maintains therein a condition essential for a substantially quantitative yield of alkyl bromide.

As a typical example showing results obtainable in the practice of the invention in an apparatus similar to that described, bromine and hydrogen sulphide are continuously added to a first reactor at the rate of 421 pounds (2.63 mols) per hour and 22.4 pounds (0.65 mol) per hour, respectively. The resulting mixture of bromine containing dissolved sulphur and HBr is fed into a column in which it is intimately contacted with methanol introduced thereinto at the rate of 166.7 pounds (5.195 mols) per hour. The temperature within the column is maintained by the heat of reaction plus the heat added to the still to hold the sulphuric acid solution therein at its boiling point of approximately 135° C. The temperature gradient of the column varies from 135° C. at the bottom to about 75° C. in the reaction zone at about the midpoint to 5° C. at the top of the column, where the low temperature is held by reflux of methyl bromide. The overhead vapors from the top of the column are 1100 pounds (11.58 mols) per hour of which 616 pounds (6.49 mols) are refluxed and 484.5 pounds (5.09 mols) are taken off as product, the yield being approximately 97 per cent of theory.

Similar results are obtained in the production of ethyl bromide from ethanol, for which purpose ordinary 95 per cent ethyl alcohol can be used with very nearly as good yield as with anhydrous ethanol.

I claim:

1. A process for making an alkyl bromide which comprises causing a reaction between hydrogen sulphide, bromine and a monohydric aliphatic alcohol selected from the group consisting of methanol and ethanol in approximately the molecular proportions given by the equation:

$$H_2S + 4Br_2 + 8ROH \rightarrow 8RBr + H_2SO_4 + 4H_2O$$

2. Process according to claim 1 in which the alkyl bromide product is continuously distilled from the reaction mixture, and the resulting aqueous sulphuric acid solution is continuously removed from the reaction zone.

3. A process for making an alkyl bromide which comprises reacting hydrogen sulphide with a molecular excess of bromine to form an intermediate product composed of hydrogen bromide and sulphur dissolved in the excess of bromine, intermixing such intermediate product with a monohydric aliphatic alcohol to form the corresponding alkyl bromide and separating such bromide from the reaction mixture.

4. A continuous process for making an alkyl bromide which comprises continuously reacting hydrogen sulphide with bromine in the proportions of approximately 1 mol of the former to 4 mols of the latter, flowing the intermediate reaction product thereby obtained into a reaction zone wherein it is intimately contacted with a stream of a monohydric aliphatic alcohol selected from the group consisting of methanol and ethanol in relative proportion of approximately 8 mols of the alcohol, maintaining the reaction at a temperature sufficient to vaporize the resulting alkyl bromide as formed, continuously removing the alkyl bromide vapors under refluxing conditions, and continuously withdrawing aqueous sulphuric acid solution from the reaction zone.

WILHELM HIRSCHKIND.